US012205745B2

(12) United States Patent
Jeong et al.

(10) Patent No.: US 12,205,745 B2
(45) Date of Patent: Jan. 21, 2025

(54) COIL COMPONENT

(71) Applicant: Samsung Electro-Mechanics Co., Ltd., Suwon-si (KR)

(72) Inventors: Soon Seong Jeong, Suwon-si (KR); Jong Min Lee, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 606 days.

(21) Appl. No.: 16/572,862

(22) Filed: Sep. 17, 2019

(65) Prior Publication Data

US 2020/0219645 A1 Jul. 9, 2020

(30) Foreign Application Priority Data

Jan. 9, 2019 (KR) ........................ 10-2019-0002632

(51) Int. Cl.

| | |
|---|---|
| ***H01F 27/28*** | (2006.01) |
| ***H01F 27/29*** | (2006.01) |
| ***H01F 41/04*** | (2006.01) |
| ***H01F 41/12*** | (2006.01) |

(52) U.S. Cl.

CPC ......... *H01F 27/2804* (2013.01); *H01F 27/29* (2013.01); *H01F 41/041* (2013.01); *H01F 41/122* (2013.01); *H01F 2027/2809* (2013.01)

(58) Field of Classification Search

CPC ......... H01F 27/2804; H01F 2027/2809; H01F 17/0013; H01F 17/0006; H01F 5/003; H01F 27/29; H01F 27/292

USPC .................................................. 336/200, 232

See application file for complete search history.

(56) References Cited

U.S. PATENT DOCUMENTS

| | | | | |
|---|---|---|---|---|
| 6,600,404 | B1 * | 7/2003 | Kajino | H05K 1/0265 336/200 |
| 9,595,384 | B2 | 3/2017 | Nakamura et al. | |
| 2014/0145812 | A1 | 5/2014 | Lee et al. | |
| 2014/0159850 | A1 * | 6/2014 | Roy | H01F 17/0013 336/200 |
| 2014/0285305 | A1 | 9/2014 | Yoo et al. | |

(Continued)

FOREIGN PATENT DOCUMENTS

| | | |
|---|---|---|
| JP | 2008-251590 A | 10/2008 |
| JP | 2015-032625 A | 2/2015 |

(Continued)

OTHER PUBLICATIONS

Korean Office Action dated Mar. 4, 2023, issued in corresponding Korean Patent Application No. 10-2019-0002632.
Korean Office Action dated May 10, 2023, issued in corresponding Korean Patent Application No. 10-2019-0002632.
Office Action issued on Oct. 23, 2023, in the corresponding Korean Patent Application No. 10-2019-0002632 with English translation.

*Primary Examiner* — Tszfung J Chan
(74) *Attorney, Agent, or Firm* — Morgan, Lewis & Bockius LLP

(57) ABSTRACT

A coil component includes an insulating substrate; a coil portion including a coil pattern, having a planar spiral shape, disposed on the insulating substrate; and a body embedding the insulating substrate and the coil portion, wherein the coil pattern comprises a first conductive layer disposed to contact the insulating substrate, and a second conductive layer disposed on the first conductive layer, wherein a thickness (T1) of the insulating substrate and a thickness (T2) of the first conductive layer satisfy 10≤T1/T2≤20.

13 Claims, 5 Drawing Sheets

A'

(56) References Cited

U.S. PATENT DOCUMENTS

| | | | | |
|---|---|---|---|---|
| 2015/0035634 | A1* | 2/2015 | Nakamura | H01F 41/046 336/170 |
| 2015/0097647 | A1* | 4/2015 | Lee | H01F 17/0013 428/429 |
| 2016/0086720 | A1* | 3/2016 | Jeong | H01F 27/292 336/200 |
| 2016/0293320 | A1* | 10/2016 | Kim | H01F 27/32 |
| 2017/0032884 | A1* | 2/2017 | Choi | H01F 41/046 |
| 2017/0178798 | A1* | 6/2017 | Yoon | H01F 41/041 |
| 2017/0372832 | A1 | 12/2017 | Choi et al. | |
| 2018/0374627 | A1 | 12/2018 | Ryu et al. | |
| 2019/0006100 | A1 | 1/2019 | Bong et al. | |
| 2021/0082614 | A1* | 3/2021 | Kim | H01F 27/323 |

FOREIGN PATENT DOCUMENTS

| | | | | | |
|---|---|---|---|---|---|
| KR | 10-2014-0066437 | A | | 6/2014 | |
| KR | 2014066437 | A | * | 6/2014 | H01F 17/0013 |
| KR | 10-1442402 | B1 | | 9/2014 | |
| KR | 10-2018-0001021 | A | | 1/2018 | |
| KR | 10-2019-0000606 | A | | 1/2019 | |
| KR | 10-2019-0001676 | A | | 1/2019 | |
| WO | WO-2016147993 | A1 | * | 9/2016 | H01F 17/0013 |

* cited by examiner

COIL COMPONENT

CROSS-REFERENCE TO RELATED APPLICATION(S)

This application claims the benefit of priority to Korean Patent Application No. 10-2019-0002632 filed on Jan. 9, 2019 in the Korean Intellectual Property Office, the entire disclosure of which is incorporated herein by reference.

TECHNICAL FIELD

The present disclosure relates to a coil component.

BACKGROUND

An inductor, a coil component, is a typical passive electronic component used in electronic devices, along with a resistor and a capacitor.

In the case of a thin film type component, a coil component, a coil pattern may be formed on an insulating substrate by a thin film process such as a plating process, one or more of magnetic composite sheets may be stacked on an insulating substrate on which the coil pattern is formed, to form a body, and external electrodes are formed on a surface of the body.

With higher performance and smaller sizes gradually implemented in electronic devices, coil components are becoming thinner.

Even when the coil component is made thinner, since the coil component secures appropriate inductance and direct-current (DC) resistance (Rdc), there may be a limitation in reducing the coil thickness of the coil component.

In order to reduce the thickness of the thin film coil component, it is necessary to reduce the thickness of the insulating substrate. However, it is problematic to make the thickness of the insulating substrate too small in terms of functioning of the insulating substrate for supporting the coil pattern.

SUMMARY

A coil component according to an aspect of the present disclosure makes it possible to implement a high-capacity inductance and to provide a certain level of rigidity for an insulating substrate while maintaining a low profile inductor.

According to an aspect of the present disclosure, a coil component includes an insulating substrate; a coil portion including a coil pattern, having a planar spiral shape, disposed on the insulating substrate; and a body embedding the insulating substrate and the coil portion, wherein the coil pattern comprises a first conductive layer disposed to contact the insulating substrate, and a second conductive layer disposed on the first conductive layer, wherein a thickness (T1) of the insulating substrate and a thickness (T2) of the first conductive layer satisfy $10 \leq T1/T2 \leq 20$.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
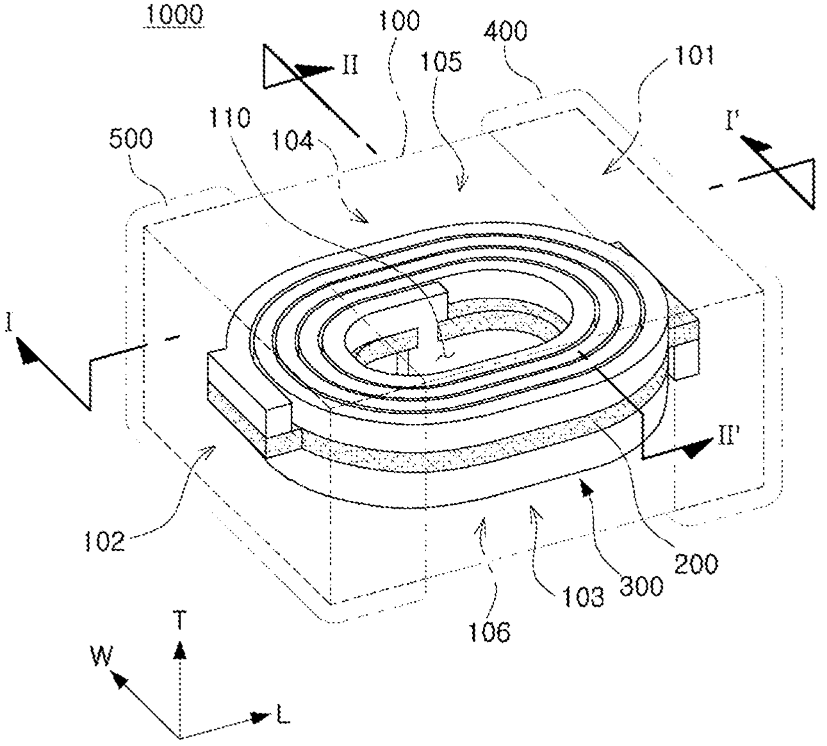
FIG. 1 is a schematic view illustrating a coil component according to an exemplary embodiment of the present disclosure.

The terms used in the description of the present disclosure are used to describe a specific embodiment, and are not intended to limit the present disclosure. A singular term includes a plural form unless otherwise indicated. The terms "include," "comprise," "is configured to," etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms "disposed on," "positioned on," and the like, may indicate that an element is positioned on or beneath an object, and does not necessarily mean that the element is positioned above the object with reference to a gravity direction.

The term "coupled to," "combined to," and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, an L direction is a first direction or a length (longitudinal) direction, a W direction is a second direction or a width direction, a T direction is a third direction or a thickness direction.

Hereinafter, a coil component according to an exemplary embodiment of the present disclosure will be described in detail with reference to the accompanying drawings. Referring to the accompanying drawings, the same or corresponding components may be denoted by the same reference numerals, and overlapped descriptions will be omitted.

In electronic devices, various types of electronic components may be used, and various types of coil components may be used between the electronic components to remove noise, or for other purposes.

In other words, in electronic devices, a coil component may be used as a power inductor, a high frequency (HF) inductor, a general bead, a high frequency (GHz) bead, a common mode filter, and the like.

Figure 2:
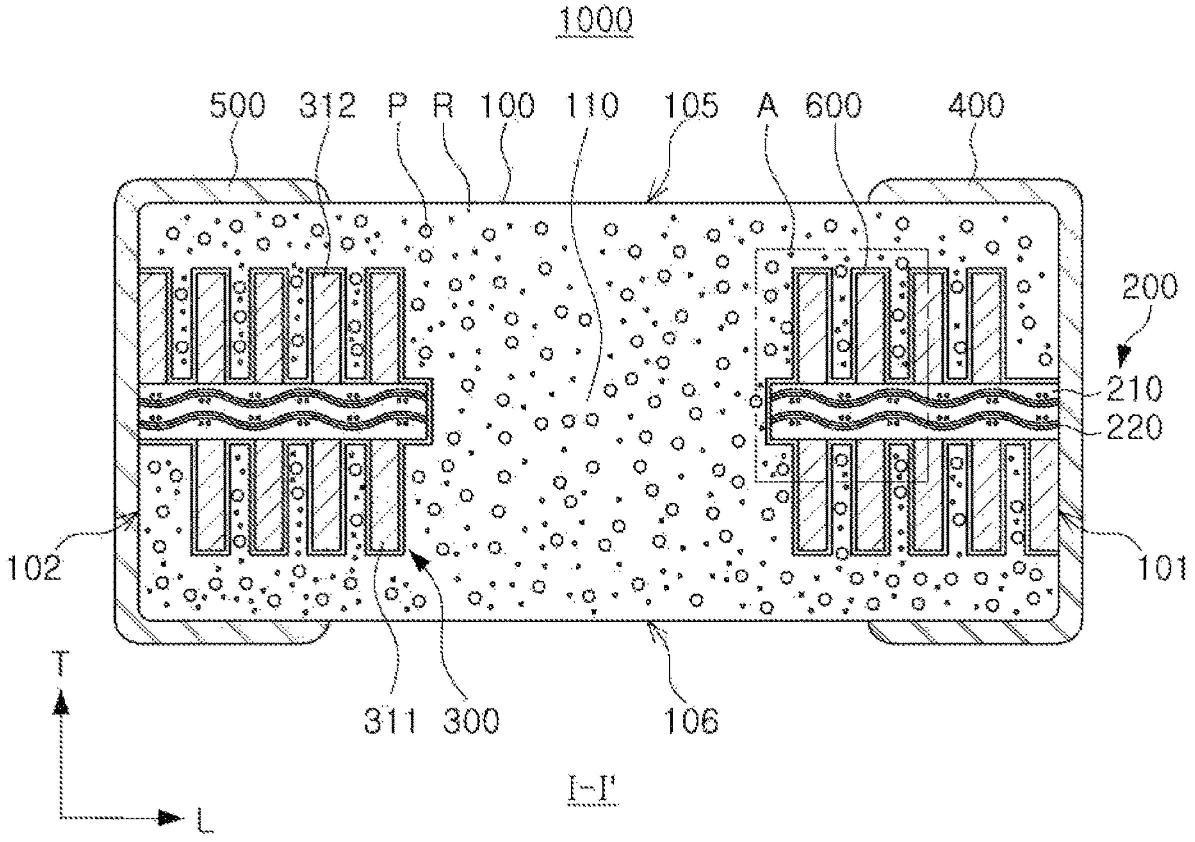
FIG. 2 is a cross-sectional view taken along line I-I' of FIG. 1.
Figure 3:
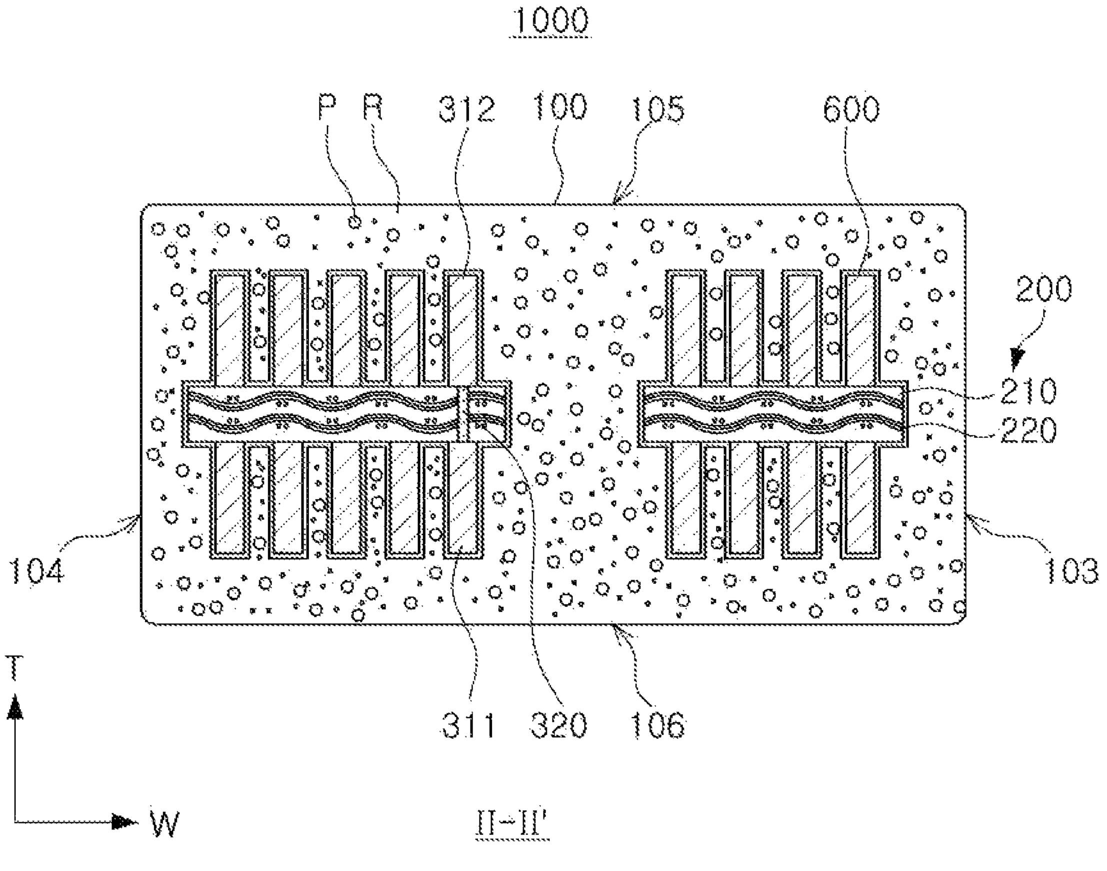
FIG. 3 is a cross-sectional view taken along line II-II' of FIG. 1.
Figure 4:
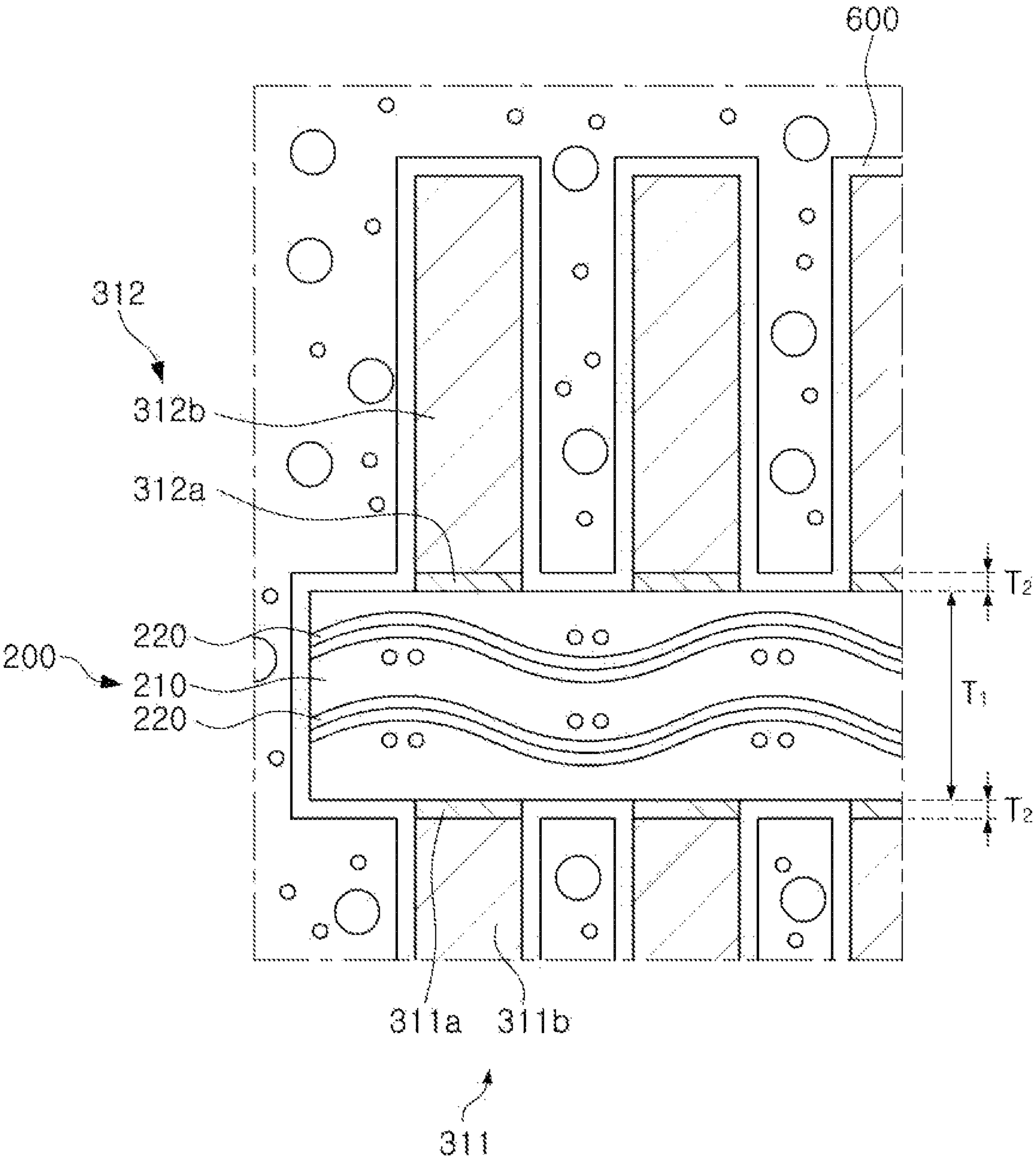
FIG. 4 is an enlarged view of portion A of FIG. 1.
Figure 5:
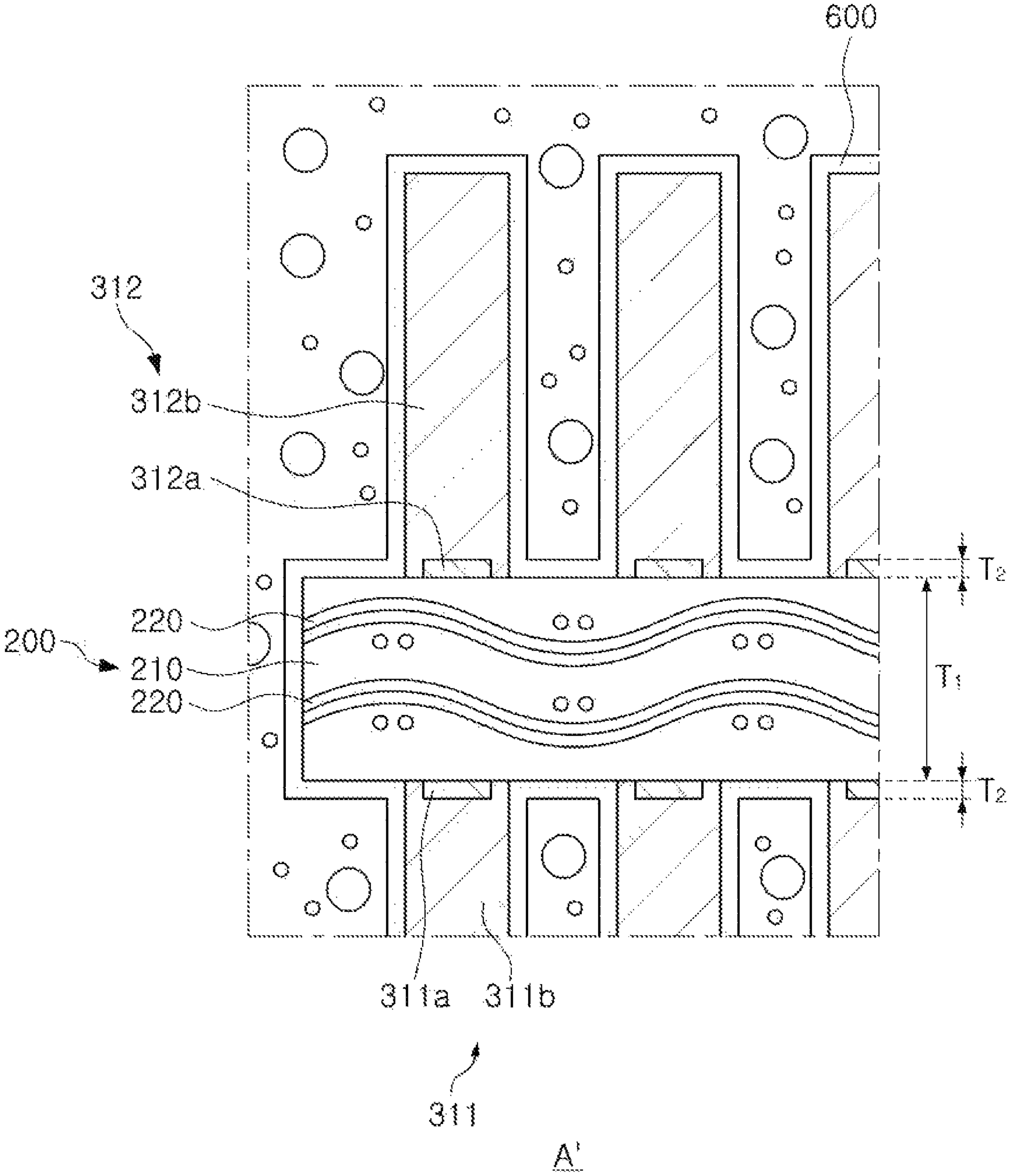
FIG. 5 is a view illustrating a modification of portion A of FIG. 1.

FIG. 1 is a schematic view illustrating a coil component according to an exemplary embodiment of the present disclosure. FIG. 2 is a cross-sectional view taken along line I-I' of FIG. 1. FIG. 3 is a cross-sectional view taken along line II-II' of FIG. 1. FIG. 4 is an enlarged view of portion A of FIG. 1. FIG. 5 is a view illustrating a modification of portion A of FIG. 1.

Referring to FIGS. 1 to 5, a coil component 1000 according to exemplary embodiments of the present disclosure may include a body 100, an insulating substrate 200, a coil portion 300, and external electrodes 400 and 500, and may further include an insulating film 600.

According to an exemplary embodiment of the present disclosure, the body 100 may form an exterior of the coil component 1000, and the insulating substrate 200 and the coil portion 300 may be embedded therein.

The body 100 may be formed to have a hexahedral shape overall.

Referring to FIGS. 1 to 3, the body 100 may include a first surface 101 and a second surface 102 facing each other in a longitudinal direction L, a third surface 103 and a fourth surface 104 facing each other in a width direction W, and a fifth surface 105 and a sixth surface 106 facing each other in a thickness direction T. Each of the first to fourth surfaces 101, 102, 103, and 104 of the body 100 may correspond to wall surfaces of the body 100 connecting the fifth surface 105 and the sixth surface 106 of the body 100. Hereinafter, both end surfaces of the body 100 may refer to the first surface 101 and the second surface 102 of the body 100, both side surfaces of the body 100 may refer to the third surface 103 and the fourth surface 104 of the body 100, one surface of the body 100 may refer to the sixth surface 106 of the body 100, and the other surface of the body 100 may refer to the fifth surface 105 of the body 100. Further, hereinafter, an upper surface and a lower surface of the body 100 may refer to the fifth surface 105 and the sixth surface 106 of the body 100, respectively, based on the directions of FIGS. 1 to 3.

The body 100 of the coil component 1000 according to an exemplary embodiment of the present disclosure may be formed such that the external electrodes 400 and 500 to be described later have a length of 2.0 mm, a width of 1.2 mm, and a thickness of 0.65 mm, but is not limited thereto. Alternatively, the body 100 of the coil component 1000 according to an exemplary embodiment of the present disclosure may be formed such that the external electrodes 400 and 500 to be described later have a length of 2.0 mm, a width of 1.6 mm, and a thickness of 0.55 mm. Still alternatively, the body 100 of the coil component 1000 according to an exemplary embodiment of the present disclosure may be formed such that the external electrodes 400 and 500 to be described later have a length of 2.0 mm, a width of 1.2 mm, and a thickness of 0.55 mm. Still alternatively, the body 100 of the coil component 1000 according to an exemplary embodiment of the present disclosure may be formed such that the external electrodes 400 and 500 to be described later have a length of 1.2 mm, a width of 1.0 mm, and a thickness of 0.55 mm. Since the above-described sizes of the coil component 1000 are merely illustrative, cases in which a size of the body 100 of the coil component 1000 are smaller than the above-mentioned dimensions may be not excluded from the scope of the present disclosure.

The body 100 may include a magnetic powder particle (P) and an insulating resin (R). Specifically, the body 100 may be formed by stacking at least one magnetic composite sheet including the insulating resin (R) and the magnetic powder particle (P) dispersed in the insulating resin (R), and then curing the magnetic composite sheet. The body 100 may have a structure other than the structure in which the magnetic powder particle (P) may be dispersed in the insulating resin (R). For example, the body 100 may be made of a magnetic material such as ferrite.

The magnetic powder particle (P) may be, for example, a ferrite powder particle or a metal magnetic powder particle.

Examples of the ferrite powder particle may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

The metal magnetic powder particle may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

The metallic magnetic powder particle may be amorphous or crystalline. For example, the metal magnetic powder particle may be a Fe—Si—B—Cr-based amorphous alloy powder, but is not limited thereto.

The ferrite powder and the metal magnetic powder particle may have an average diameter of about 0.1 μm to 30 μm, respectively, but are not limited thereto.

The body 100 may include two or more types of magnetic powder particles (P) dispersed in an insulating resin (R). In this case, the term "different types of magnetic powder particle (P)" means that the magnetic powder particles (P) dispersed in the insulating resin (R) are distinguished from each other by diameter, composition, crystallinity, and a shape. For example, the body 100 may include two or more magnetic powder particles (P) of different diameters.

The insulating resin (R) may include an epoxy, a polyimide, a liquid crystal polymer, or the like, in a single form or in combined forms, but is not limited thereto.

The body 100 may include a core 110 passing through the coil portion 300 to be described later. The core 110 may be formed by filling at least a portion of the magnetic composite sheet with through-holes formed in the insulating substrate 200 in operations of stacking and curing the magnetic composite sheet, but is not limited thereto.

The insulating substrate 200 may be embedded in the body 100. The insulating substrate 200 may support the coil portion 300 to be described later.

The insulating substrate 200 may include an insulating material, for example, a thermosetting insulating resin such as an epoxy resin, a thermoplastic insulating resin such as polyimide, or a photosensitive insulating resin, or the insulating substrate 200 may include an insulating material in which a reinforcing material such as a glass fiber or an inorganic filler is impregnated with an insulating resin. For example, the insulating substrate 200 may include an insulating material such as prepreg, Ajinomoto Build-up Film (ABF), FR-4, a bismaleimide triazine (BT) film, a photo-imageable dielectric (PID) film, and the like, but are not limited thereto.

As the inorganic filler, at least one or more selected from a group consisting of silica ($SiO_2$), alumina ($Al_2O_3$), silicon carbide (SiC), barium sulfate ($BaSO_4$), talc, mud, a mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

When the insulating substrate 200 includes an insulating material including a reinforcing material, the insulating substrate 200 may provide better rigidity. When the insulating substrate 200 is formed of an insulating material not containing glass fibers, the insulating substrate 200 may be advantageous for reducing a thickness of the overall coil portion 300. When the insulating substrate 200 includes an insulating material containing a photosensitive insulating resin, the number of processes for forming the coil portion 300 may be reduced. Therefore, it may be advantageous in reducing production costs, and a fine via may be formed.

According to an exemplary embodiment of the present disclosure, the insulating substrate 200 may include an insulating resin 210 and a glass cloth 220 impregnated with the insulating resin 210. As a non-limiting example, the insulating substrate 200 may include a copper clad laminate (CCL). The glass cloth 220 may be a plurality of glass fibers are woven.

The glass cloth may be formed as a plurality of layers. When the glass cloth is formed as a plurality of layers, the rigidity of the insulating substrate 200 may be improved. Also, even when the insulating substrate 200 is damaged in an operation of removing first conductive layers 311*a* and 312*a* to be described later, a shape of the insulating substrate 200 may be maintained and the defect rate may be reduced.

A thickness (T1) of the insulating substrate 200 may be greater than 20 μm but less than 40 μm, and more preferably 25 μm or more and 35 μm or less. When the thickness (T1) of the insulating substrate 200 is 20 μm or less, it may be difficult to secure the rigidity of the insulating substrate 200, to support the coil portion 300 to be described later in the manufacturing process. When the thickness (T1) of the insulating substrate 200 is 40 μm or more, it may be disadvantageous to make the coil portions thinner, and it may be disadvantageous in realizing high capacity inductance, since a volume occupied by the insulating substrate 200 in the body 100 of the same volume increases.

The coil portion 300 may include coil patterns 311 and 312, having a planar spiral shape, arranged on the insulating substrate 200, and may be embedded in the body 100, to manifest the characteristics of the coil component. For example, when the coil component 1000 according to an exemplary embodiment of the present disclosure is used as a power inductor, the coil portion 300 may function to stabilize the power supply of an electronic device by storing an electric field as a magnetic field and maintaining an output voltage.

The coil portion 300 may include the coil patterns 311 and 312, and a via 320. Specifically, based on the directions of FIGS. 1, 2, and 3, a first coil pattern 311 may be disposed on a lower surface of the insulating substrate 200 facing the sixth surface 106 of the body 100, and a second coil pattern 312 may be disposed on an upper surface of the insulating substrate 200. The via 320 may pass through the insulating substrate 200, and may be in contact with and connected to the first coil pattern 311 and the second coil pattern 312, respectively. In this configuration, the coil portion 300 may function as a single coil which forms one or more turns about the core 110 overall.

Each of the first coil pattern 311 and the second coil pattern 312 may be in a planar spiral shape having at least one turn formed about the core 110. For example, based on the direction of FIG. 2, the first coil pattern 311 may form at least one turn about the core 110 on the lower surface of the insulating substrate 200.

End portions of the first and second coil patterns 311 and 312 may be connected to the first and second external electrodes 400 and 500, respectively, which will be described later. For example, the end portion of the first coil pattern 311 may be connected to the first external electrode 400, and the end portion of the second coil pattern 312 may be connected to the second external electrode 500.

For example, the end portion of the first coil pattern 311 may be exposed from the first surface 101 of the body 100, and the end portion of the second coil pattern 312 may be exposed from the second surface 102 of the body 100, to be in contact with and connected to the first and second external electrodes 400 and 500 disposed on the first and second surfaces 101 and 102 of the body 100, respectively.

Each of the first and second coil patterns 311 and 312 may include first conductive layers 311*a* and 312*a* formed to contact the insulating substrate 200, and second conductive layers 311*b* and 312*b* disposed on the first conductive layers 311*a* and 312*a*. Based on the directions of FIGS. 4 and 5, the first coil pattern 311 may include a first conductive layer 311*a* formed to contact the lower surface of the insulating substrate 200, and a second conductive layer 311*b* disposed on the first conductive layer 311*a*. Based on the directions of FIGS. 4 and 5, the second coil pattern 312 may include a first conductive layer 312*a* formed to contact the upper surface of the insulating substrate 200, and a second conductive layer 312*b* disposed on the first conductive layer 312*a*.

The first conductive layers 311*a* and 312*a* may be seed layers for forming the second conductive layers 311*b* and 312*b* by an electrolytic plating process. The first conductive layers 311*a* and 312*a*, the seed layers of the second conductive layers 311*b* and 312*b*, may be formed to be thinner than the second conductive layers 311*b* and 312*b*. The first conductive layers 311*a* and 312*a* may be formed by a thin film process such as sputtering or an electroless plating process. When the first conductive layers 311*a* and 312*a* are formed by a thin film process such as sputtering, at least a portion of materials constituting the first conductive layers 311*a* and 312*a* may be passed through the insulating substrate 200. It can be confirmed that a concentration of a metal material constituting the first conductive layers 311*a* and 312*a* in the insulating substrate 200 varies in the thickness direction T of the body 100.

A thickness (T2) of the first conductive layers 311*a* and 312*a* may be 1.5 μm or more and 3 μm or less. When the thickness of the first conductive layers 311*a* and 312*a* is less than 1.5 μm, it may be difficult to realize the first conductive layers 311*a* and 312*a*. When the thickness of the first conductive layers 311*a* and 312*a* is greater than 3 μm, in removing the first conductive layers 311*a* and 312*a*, except for regions in which the second conductive layers 311*b* and 312*b* are formed by a plating process, it may be advantageous that the first conductive layers 311*a* and 312*a* remain, or are etched away together with the second conductive layers 311*b* and 312*b*, when being excessively etched.

Referring to FIG. 4, the second conductive layers 311*b* and 312*b* may expose at least a portion of the side surfaces of the first conductive layers 311*a* and 312*a*. According to an exemplary embodiment of the present disclosure, a seed layer for forming the first conductive layers 311*a* and 312*a* may be formed on both side surfaces of the insulating substrate 200, a plating resist for forming the second conductive layers 311*b* and 312*b* may be formed on the seed layer, the second conductive layers 311*b* and 312*b* may be formed by the electrolytic plating process, the plating resist may be removed, and the seed layer on which the second conductive layers 311*b* and 312*b* are not formed may be selectively removed. Therefore, at least a portion of the side surfaces of the first conductive layers 311*a* and 312*a* formed by selectively removing the seed layer may be exposed without being covered by the second conductive layers 311*b* and 312*b*. The seed layer may be formed by performing an electroless plating process or a sputtering process on the insulating substrate 200. Alternatively, the seed layer may be a copper foil of a copper clad laminate (CCL). The plating resist may be formed by applying a material for forming the plating resist to the seed layer and then performing a photolithography process thereon. After performing the photolithography process, an opening may be formed in a region in which the second conductive layers 311*b* and 312*b* are to be formed. The selective removal of the seed layer may be performed by a laser process or an etching process. In the case in which the seed layer is selectively removed by etching, the first conductive layers 311*a* and 312*a* may be formed in such a manner that the cross-sectional area thereof increases as the side surfaces thereof proceed in a downward direction.

Referring to FIG. 5, the second conductive layers 311*b* and 312*b* may cover the first conductive layers 311*a* and 312*a*. In a different manner to FIG. 4, the first conductive layers 311*a* and 312*a* patterned in a plane spiral shape may be respectively disposed on both side surfaces of the insulating substrate 200, and the second conductive layers 311*b* and 312*b* may be disposed on the first conductive layers 311*a* and 312*a* by an electrolytic plating process. When the second conductive layers 311*b* and 312*b* are formed by an anisotropic plating process, a plating resist may not be used, but is not limited thereto. When the second conductive layers 311*b* and 312*b* are formed by an isotropic plating process, a plating resist for forming the second conductive layer may be used. An opening for exposing the first conductive layers 311*a* and 312*a* may be formed in the plating resist for forming the second conductive layer. A diameter of the opening may be larger than a line width of the first conductive layers 311*a* and 312*a*. Therefore, the second conductive layers 311*b* and 312*b* filling the opening may cover the first conductive layers 311*a* and 312*a*.

The via 320 may include at least one conductive layer. For example, when the via 320 is formed by an electrolytic plating process, the via 320 may include a seed layer formed on an inner wall of a via hole passing through the insulating substrate 200, and an electrolytic plating layer filling the via hole formed with the seed layer. The seed layer of the via 320 may be formed integrally with the first conductive layers 311*a* and 312*a* in the same process as the first conductive layers 311*a* and 312*a*, and may form a boundary between the seed layer and each of the first conductive layers 311*a* and 312*a* in a process different from the first conductive layers 311*a* and 312*a*. According to an exemplary embodiment of the present disclosure, the seed layer of the via and the first conductive layers 311*a* and 312*a* may be formed in different processes to form a boundary therebetween.

When the line widths of the coil patterns 311 and 312 are excessively wide, a volume of the magnetic body in the body 100 may be reduced to adversely affect inductance. In a non-limiting example, an aspect ratio (AR) of the coil patterns 311 and 312 may be between 3:1 and 9:1.

Each of the coil patterns 311 and 312 and the via 320 may be formed of a conductive material such as copper (Cu), aluminum (Al), silver (Ag), tin (Sn), gold (Au), nickel (Ni), lead (Pb), titanium (Ti), chromium (Cr), or alloys thereof, but are not limited thereto. As a non-limiting example, when the first conductive layers 311*a* and 312*a* are formed in a sputtering process, and the second conductive layers 311*b* and 312*b* are formed by an electrolytic plating process, the first conductive layers 311*a* and 312*a* may include at least one of molybdenum (Mo), chromium (Cr), and titanium (Ti), and the second conductive layers 311*b* and 312*b* may include copper (Cu). As another non-limiting example, when the first conductive layers 311*a* and 312*a* are formed by an electroless plating process, and the second conductive layers 311*b* and 312*b* are formed by an electrolytic plating process, the first conductive layers 311*a* and 312*a*, and the second conductive layers 311*b* and 312*b* may include copper (Cu). In this case, a density of the copper (Cu) in the first conductive layers 311*a* and 312*a* may be lower than a density of the copper (Cu) in the second conductive layers 311*b* and 312*b*.

The thickness (T1) of the insulating substrate 200 and the thickness (T2) of the first conductive layers 311*a* and 312*a* satisfy $10 \leq T1/T2 \leq 20$. This will be described later.

The external electrodes 400 and 500 may be disposed on surfaces of the body 100, and may be connected to both end portions of the coil portion 300, respectively. According to an exemplary embodiment of the present disclosure, both end portions of the coil portion 300 may be exposed from the first and second surfaces 101 and 102 of the body 100, respectively. Therefore, the first external electrode 400 may be disposed on the first surface 101 and may be in contact with and connect to an end portion of the first coil pattern 311 exposed from the first surface 101 of the body 100, and the second external electrode 500 may be disposed on the second surface 102 and may be in contact with and connect to an end portion of the second coil pattern 312 exposed from the second surface 102 of the body 100.

The external electrodes 400 and 500 may have a single-layer structure or a multilayer structure. For example, the first external electrode 400 may include a first layer comprising copper, a second layer disposed on the first layer and comprising nickel (Ni), and a third layer disposed on the second layer and comprising tin (Sn). The first to third surfaces may be formed by an electrolytic plating process, but is not limited thereto. As another example, the first external electrode 400 may include a resin electrode including a conductive powder particle and a resin, and a plating layer formed by a plating process on the resin electrode.

The external electrodes 400 and 500 may be formed of a conductive material such as copper (Cu), aluminum (Al), silver (Ag), tin (Sn), gold (Au), nickel (Ni), lead (Pb), titanium (Ti), or alloys thereof, but is not limited thereto.

The insulating film 600 may be formed on the insulating substrate 200 and the coil portion 300. The insulating film 600 may be for insulating the coil portion 300 from the body 100, and may include a known insulating material such as parylene, and the like. An insulating material included in the insulating film 600 may be any insulating material, and is not particularly limited thereto. The insulating film 600 may be formed using a vapor deposition process or the like, but not limited thereto, and may be formed using stacking an insulation film on both surfaces of the insulating substrate 200. In the former case, the insulating film 600 may be formed in the form of a conformal film along the surfaces of the insulating substrate 200 and the coil portion 300. In the latter case, the insulating film 600 may be formed to fill a space between neighboring turns of the coil patterns 311 and 312. As described above, a plating resist may be formed on the insulating substrate 200 for forming the second conductive layers 311*b* and 312*b*, and such a plating resist may be a permanent resist which may be not removed. In this case, the insulating film 600 may be a plating resist which may be a permanent resist. The insulating film 600 may be omitted, when the body 100 secures sufficient insulation resistance under operating conditions of the coil component 1000 according to an exemplary embodiment of the present disclosure.

In Table 1, in Experimental Examples 1 to 9 in which ratios of a thickness (T1) of an insulating substrate to a thickness (T2) of a first conductive layer were changed, it was evaluated whether the inductance was realized, the rigidity of the insulating substrate was secured, and whether the first conductive layer was capable of being implemented.

In Experimental Examples 1 to 9, coil portions were manufactured to have the same number of turns, the same line width, and the same thickness, and to make spaces between neighboring turns of the coil portions all equal. A body was manufactured such that a thickness of the coil component was 0.55 mm.

In Table 1 below, it was evaluated as passed that inductance capacity obtained from the simulation falls within ranges of 90% to 110% of the inductance capacity. In the case of the rigidity of the insulating substrate, the thickness of the insulating substrate was evaluated as the presence or absence of breakage (tearing) of the substrate due to flow of plating liquid in a plating bath. In the case of the first conductive layer, it was determined as passed or failed, based on the thickness at which phenomenon that a second conductive layer is not plated occurs. Further, since the lowest thickness of the first conductive layer capable of realizing the second conductive layer is 1.5 μm at the level of the current technique, it was evaluated as passed, based thereon.

TABLE 1

| | T1 (μm) | T2 (μm) | T1/T2 | Inductance Implementation | Rigidity of Insulating Substrate | Possibility of implementing First Conductive Layer |
|---|---|---|---|---|---|---|
| # 1 | 40 | 1.5 | 26.7 | Failed | Passed | Passed |
| # 2 | 40 | 1 | 40 | Failed | Passed | Failed |
| # 3 | 40 | 0.5 | 80 | Failed | Passed | Failed |
| # 4 | 30 | 3 | 10 | Passed | Passed | Passed |
| # 5 | 30 | 2 | 15 | Passed | Passed | Passed |
| # 6 | 30 | 1.5 | 20 | Passed | Passed | Passed |
| # 7 | 30 | 1 | 30 | Passed | Passed | Failed |
| # 8 | 30 | 0.5 | 60 | Passed | Passed | Failed |
| # 9 | 20 | 3 | 6.7 | Passed | Failed | Passed |

Referring to Table 1, each of Experimental Examples 4, 5, and 6 satisfying 10≤T1/T2≤20 passed evaluations for inductance implementation, rigidity of insulating substrate, and possibility of implementing the first conductive layer. However, each of Experimental Examples 1 to 3, and 7 to 9 failed to pass at least one evaluation for inductance implementation, rigidity of insulating substrate, and possibility of implementing the first conductive layer.

In the case of Experimental Example 9 in which the thickness (T1) of the insulating substrate was 20 μm, rigidity could not be secured in the manufacturing process. In the case of Experimental Examples 2, 3, 7, and 8 in which the thickness (T2) of the first conductive layer was less than 1.5 μm, it may be difficult to implement the first conductive layer.

According to the present disclosure, it is possible to implement high-capacity inductance and secure rigidity of a certain level of the insulating substrate while being low profile.

While exemplary embodiments have been shown and described above, it will be apparent to those skilled in the art that modifications and variations could be made without departing from the scope of the present disclosure as defined by the appended claims.

What is claimed is:

1. A coil component comprising:

an insulating substrate;

a coil portion including a coil pattern, having a planar spiral shape, disposed on the insulating substrate;

a body embedding the insulating substrate and the coil portion; and an insulating film disposed between the coil portion and the body and covering the coil portion, wherein the coil pattern comprises a first conductive layer disposed to contact the insulating substrate, and a second conductive layer disposed on the first conductive layer, wherein a thickness (T1) of the insulating substrate and a thickness (T2) of the first conductive layer satisfy 10≤T1/T2≤20, wherein the insulating substrate comprises an insulating resin and a glass cloth disposed in the insulating resin, and the glass cloth is provided in a plurality of layers, wherein the coil pattern has an aspect ratio of 3 or more and 9 or less, wherein the insulating film covers the first conductive layer, the second conductive layer, and the insulating substrate in an integrated manner, and wherein the first conductive layer is disposed directly on the insulating substrate and is spaced apart from the insulating film, and at least a portion of the second conductive layer is disposed between a side of the first conductive layer and the insulating film and is in direct contact with the insulating substrate.

2. The coil component according to claim 1, wherein the thickness (T2) of the first conductive layer is 1.5 μm or more and 3 μm or less.

3. The coil component according to claim 1, wherein the thickness (T1) of the insulating substrate is greater than 20 μm and less than 40 μm.

4. The coil component according to claim 1, wherein the second conductive layer covers the first conductive layer.

5. The coil component according to claim 1, wherein a line width of the second conductive layer is larger than a line width of the first conductive layer.

6. The coil component according to claim 1, wherein the coil portion comprises:

a first coil pattern, having a planar spiral shape, disposed on one surface of the insulating substrate;

a second coil pattern, having a planar spiral shape, disposed on another surface of the insulating substrate facing the one surface of the insulating substrate; and a via passing through the insulating substrate to connect the first coil pattern and the second coil pattern to each other, wherein each of the first and second coil patterns comprises the first and second conductive layers.

7. The coil component according to claim 1, further comprising first and second external electrodes disposed on the body and respectively connected to both end portions of the coil portion.

8. The coil component according to claim 1, wherein the insulating film directly contacts one surface of the insulating substrate.

9. A coil component comprising:

an insulating substrate;

a coil portion including a coil pattern, having a planar spiral shape, disposed on the insulating substrate;

a body embedding the insulating substrate and the coil portion; and an insulating film disposed between the coil portion and the body and covering the coil portion, wherein the coil pattern comprises a first conductive layer disposed to directly contact the insulating substrate, and a second conductive layer disposed on the first conductive layer, wherein the insulating film directly contacts one surface of the insulating substrate, wherein the insulating substrate comprises an insulating resin and a glass cloth disposed in the insulating resin, and the glass cloth is provided in a plurality of layers, wherein the coil pattern has an aspect ratio of 3 or more and 9 or less, wherein the insulating film covers the first conductive layer, the second conductive layer, and the insulating substrate in an integrated manner, and wherein the first conductive layer is disposed directly on the insulating substrate and is spaced apart from the insulating film, and at least a portion of the second conductive layer is disposed between a side of the first conductive layer and the insulating film and is in direct contact with the insulating substrate.

10. The coil component according to claim 9, wherein the thickness (T2) of the first conductive layer is 1.5 μm or more and 3 μm or less.

11. The coil component according to claim 9, wherein the second conductive layer covers the first conductive layer.

12. The coil component according to claim 9, wherein a line width of the second conductive layer is larger than a line width of the first conductive layer.

13. A coil component comprising:

an insulating substrate;

a coil portion including a coil pattern, having a planar spiral shape, disposed on the insulating substrate;

a body embedding the insulating substrate and the coil portion; and an insulating film disposed between the coil portion and the body and covering the coil portion, wherein the coil pattern comprises a first conductive layer disposed to contact the insulating substrate, and a second conductive layer disposed on the first conductive layer, wherein the insulating substrate comprises an insulating resin and a glass cloth disposed in the insulating resin, and the glass cloth is provided in a plurality of layers, wherein the coil pattern has an aspect ratio of 3 or more and 9 or less, wherein the insulating film covers the first conductive layer, the second conductive layer, and the insulating substrate in an integrated manner, and wherein the first conductive layer is disposed directly on the insulating substrate and is spaced apart from the insulating film, and at least a portion of the second conductive layer is disposed between a side of the first conductive layer and the insulating film and is in direct contact with the insulating substrate.

* * * * *